United States Patent [19]

Isono et al.

[11] Patent Number: 5,113,264
[45] Date of Patent: May 12, 1992

[54] METHOD OF AND APPARATUS FOR FORMING HALFTONE DOTS

[75] Inventors: Koichi Isono; Masayuki Nakano; Yoshiyuki Nishigaito, all of Hikone, Japan

[73] Assignee: Dainippon Screen Mfg. Co., Ltd., Kyoto, Japan

[21] Appl. No.: 446,040

[22] Filed: Dec. 5, 1989

[30] Foreign Application Priority Data

Dec. 15, 1988 [JP] Japan ................................. 63-317347

[51] Int. Cl.⁵ ............................................. H04M 1/40
[52] U.S. Cl. ....................................... 358/298; 358/457
[58] Field of Search ................... 346/76 PH; 358/283, 358/296, 298, 455, 457, 459; 400/120

[56] References Cited

U.S. PATENT DOCUMENTS

| | | | |
|---|---|---|---|
| 4,032,978 | 6/1977 | Wong | 358/298 |
| 4,033,443 | 7/1977 | Bunge et al. | 358/455 |
| 4,340,912 | 7/1982 | Troxel | 358/459 |
| 4,578,714 | 3/1986 | Sugiura et al. | 358/457 |
| 4,700,235 | 10/1987 | Gall | 358/298 |
| 4,930,023 | 5/1990 | Yakame | 358/457 |

FOREIGN PATENT DOCUMENTS 63-97067 4/1988 Japan .

*Primary Examiner*—William M. Shoop, Jr.
*Assistant Examiner*—Larry Moskowitz
*Attorney, Agent, or Firm*—Lowe, Price, LeBlanc and Becker

[57] ABSTRACT

Halftone dots are formed on the basis of three sets of screen pattern data assigned to the to a same combined area, in which a plurality of halftone dots are to be formed. The three sets of screen pattern data have different threshold values assigned to respective pixels in the combined area, and are stored in SPM's (101–116). Eight SPM's (Screen Pattern memory units) store a first set of the screen pattern data, six SPM's store a second one, end two SPM's store a third one. One of the sixteen SPM's is randomly selected with respect to each pixel, whereby one of the threshold values ($D_s$) stored in the selected SPM is compared with an iamge signal ($V_1$). A dot signal indicating whether or not each pixel is solid is produced on the basis of the comparison. Accordingly, a grid-like pattern of halftone dots to be seen in a highlight area or a shadow area is prevented.

14 Claims, 8 Drawing Sheets

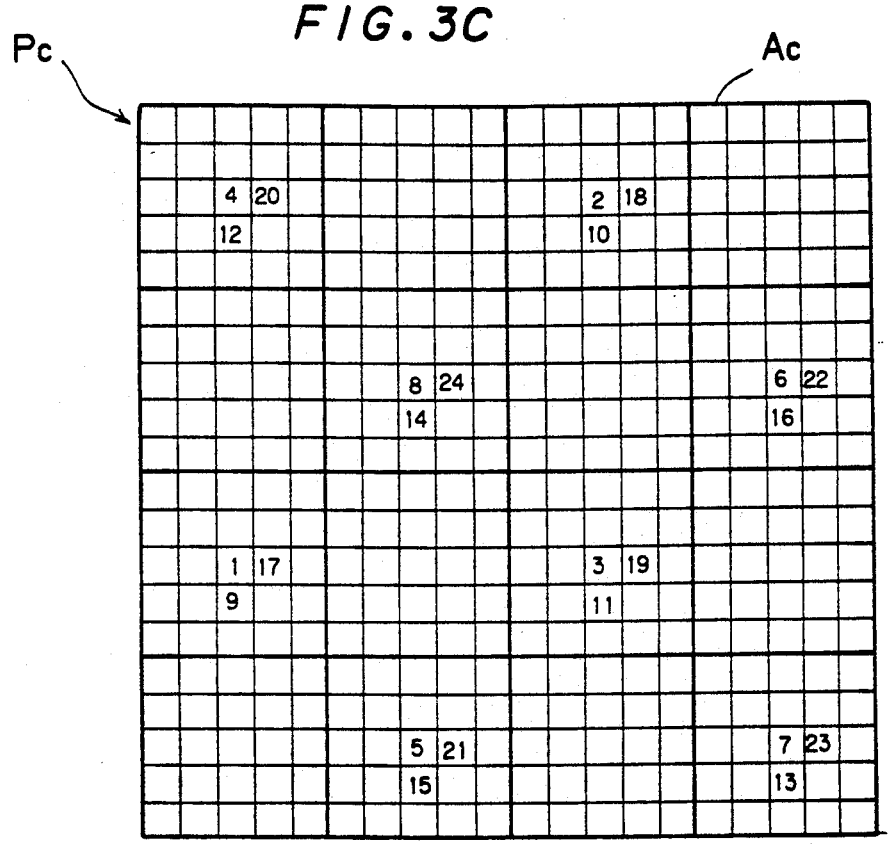

FIG. 4A
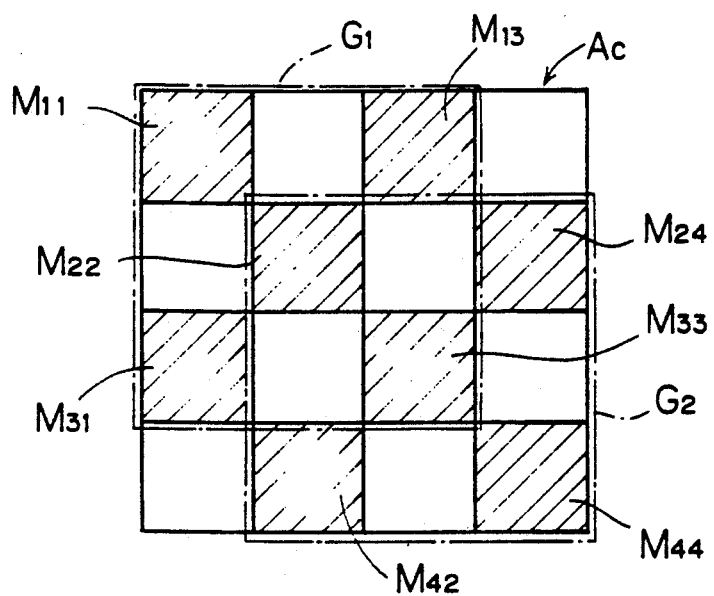
FIG. 4B
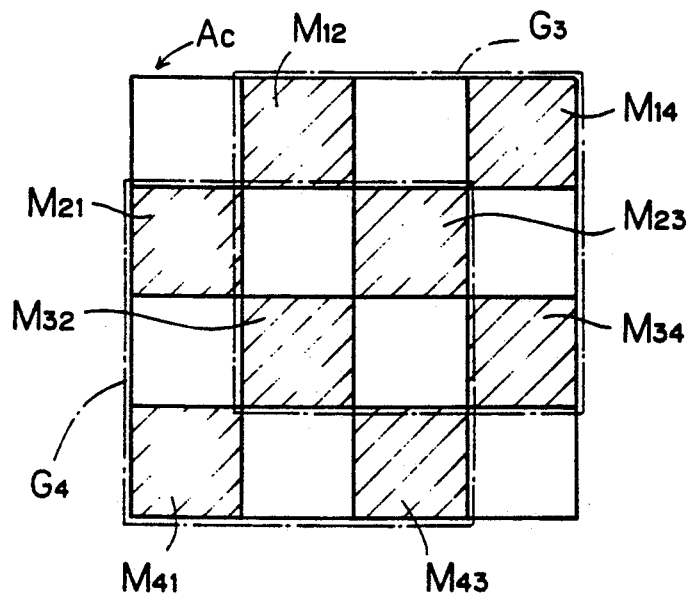
FIG. 4C

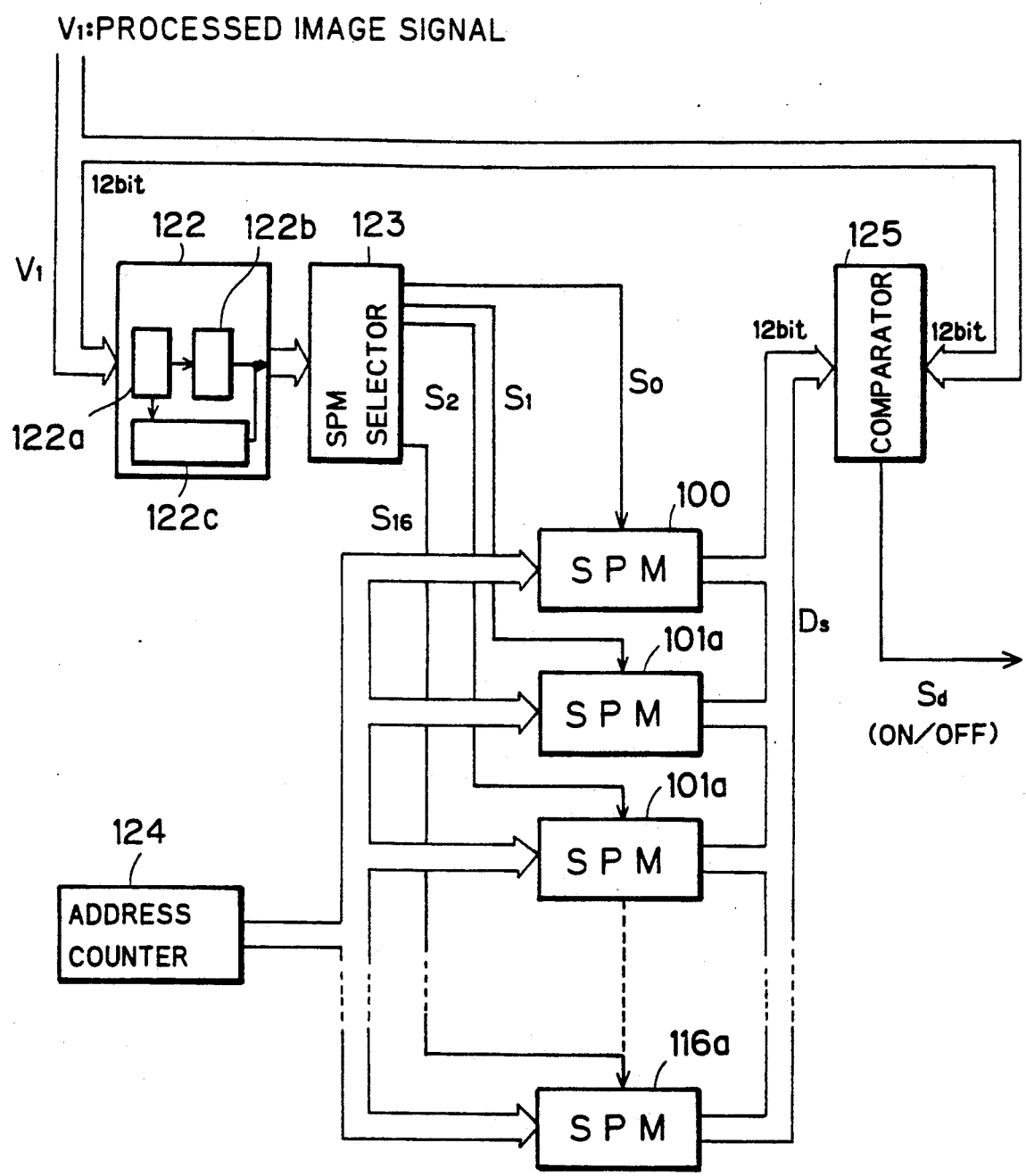

METHOD OF AND APPARATUS FOR FORMING HALFTONE DOTS

BACKGROUND OF THE INVENTION

1. Field of the Invention

The present invention is related to a method of and an apparatus for forming halftone dots in a halftone image, which is recorded on photosensitive film or the like.

2. Description of the Prior Art

In general, halftone dots in a halftone image are formed as a result of comparison between image data and threshold data referred to as "screen pattern" data. The image data are compared with the screen pattern data with respect to each pixel in an image represented by the image data, whereby a dot signal indicating whether or not each pixel is to be solid is produced. The halftone dots are formed of solid pixels which are exposed as a function of the dot signal.

The screen pattern data are so prepared that the size of a halftone dot increases on a positive halftone image as the density of the original image increases. Therefore, one set of screen pattern data are usually assigned to a full area of a halftone dot at the halftone-dot area rate of (hereinafter referred to as "full halftone-dot area"). If each of the screen pattern data assigned to each pixel in the full halftone-dot area has a different value from each other, the number of tone gradation levels represented by the screen pattern data is equal to the number of pixels in the full halftone-dot area.

On the other hand, at least one technique, such as one disclosed in Japanese Patent Laying Open Gazette No. 63-97067, has been proposed in order to attain a greater number of tone gradation levels while maintaining the size of the full halftone-dot area, that is, while maintaining a screen ruling. This technique employs a combined area which consists of a plurality of full halftone-dot areas, and combined screen pattern data whose values are different from each other and which are assigned to the pixels in the combined area. For example, if the combined area consists of two full halftone-dot areas each of which is a 8×8 pixel matrix, the combined screen pattern data represent 128 levels of tone gradation.

A halftone image produced with the combined screen pattern data, however, may cause the following problem. In a part of a halftone image where density is uniform, a fixed shape of halftone dots is repeated because the combined screen pattern data are assigned repeatedly on an image. FIGS. 1A and 1C illustrate enlarged views of a highlight area and a shadow area thus formed, respectively. The highlight area usually has the halftone-dot area rate of at most 10%, and the shadow area usually has a halftone-dot area rate of at least 90%. The highlight area of FIG. 1A includes a first solid portion consisting of one solid dot and a second solid portion consisting of two solid dots. The shadow area in FIG. 1C similarly includes a few types of blank portions. The solid portions and the blank portions are formed repeatedly in respective areas. Consequently, the array of the solid portions and that of the blank portions in FIGS. 1A and 1C can be seen as grid-like patterns as shown in FIGS. 1B and 1D, respectively, with the naked eye. Since these grid-like patterns do not exist in an original image, they decrease the quality of the halftone image. This problem is important especially in the highlight area and the shadow area.

SUMMARY OF THE INVENTION

The present invention is, therefore, directed to a method and an apparatus for forming halftone dots in a halftone image. The method comprise the steps of: (a) preparing image data, however, representing an original image, (b) preparing plural sets of threshold data, each of which includes predetermined threshold values assigned to respective pixels in a unit pixel block of a prescribed shape, said plural sets of threshold data having different arrangements of the threshold values from each other, (c) fixing the correspondance of each pixel in the original image to each pixel in the unit pixel block, (d) randomly selecting one of the plural sets of threshold data with respect to each pixel to thereby pick up one of the threshold values in a selected set of threshold data at each pixel, (e) comparing the image data with a threshold value picked up at the step (d) with respect to each pixel to thereby produce a dot signal indicating whether or not each pixel is to be solid, and (f) forming halftone dots as a function of the dot signal. The apparatus of the invention comprises a corresponding set of means. According to one aspect of the present invention, each of the plural sets of threshold data is so established that a plurality of halftone dots are to be formed in the unit pixel block.

According to another aspect of the present invention, the selecting at the step (d) is executed while probabilities of selecting the respective plural sets of threshold data are fixed in advance.

According to still another aspect of the present invention, the threshold values in each of the plural sets of threshold data are different from each other.

According to another aspect of the present invention, the plural sets of threshold data are so established that the halftone dots are formed checkerwise in the unit pixel block when the image data for the unit pixel block has a data value corresponding to a halftone-dot area rate of at most about 10 percent.

According to still another aspect of the present invention, the plural sets of threshold data are so established that blank areas at which the halftone dots do not exist are formed checkerwise in the unit pixel block when the image data for the unit pixel block has a data value corresponding to a halftone-dot area rate of at least about 90 percent.

Preferably, differences between the threshold values of the plural sets of threshold data at each pixel in the unit pixel block are within a prescribed range.

The threshold values at each pixel in the unit pixel block may be common to the plural sets of threshold data in a range of the threshold values corresponding to a halftone-dot area rate ranging from at least about 10 percent to at most about 90 percent.

Accordingly, an object of the present invention is to prevent grid-like patterns or line patterns in the highlight and shadow areas of a halftone image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A through 3C illustrate the arrangement of three sets of screen pattern data;

FIGS. 4A through 4C illustrate grouping of unit areas in a combined area;

FIGS. 5 and 7 are block diagrams showing the internal structure of a screen pattern memory unit.

DESCRIPTION OF THE PREFERRED EMBODIMENTS

Figure 1A:
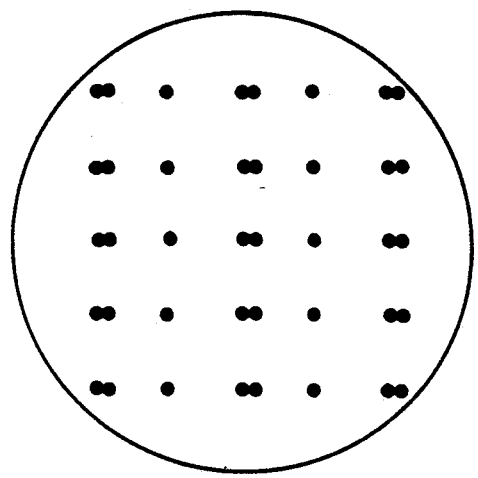
FIGS. 1A through 1D illustrate grid-like pattern in the prior art.
Figure 1B:
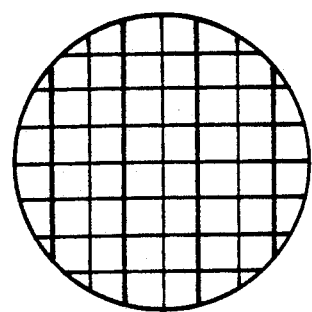
Figure 1C:
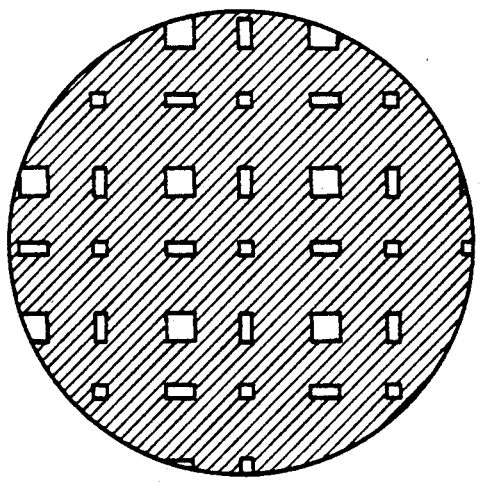
Figure 1D:
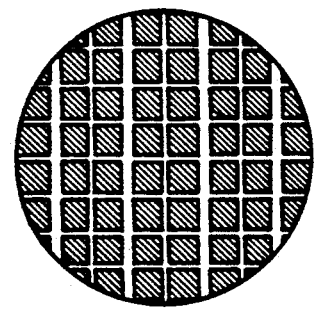
Figure 2:
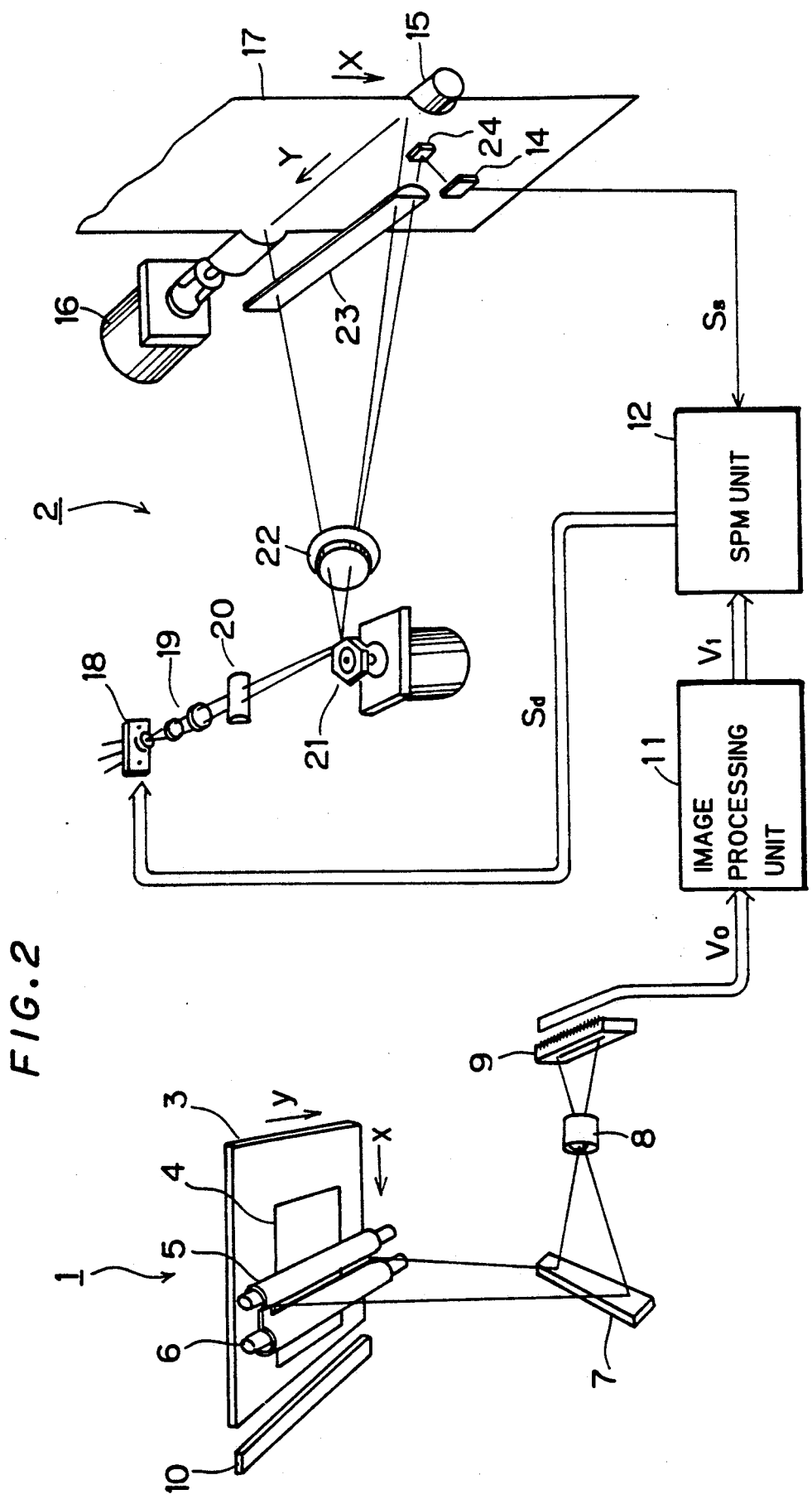
FIG. 2 is a diagram showing the structure of an image scanner according to a preferred embodiment of the present invention.

FIG. 2 is a diagram showing the structure of a monochrome scanner of a flat bed type according to a preferred embodiment of the present invention. This color image scanner comprises a reading scanner unit 1 and a recording scanner unit 2.

An original 4 is mounted on a transparent plate 3 in the reading scanner unit 1. A flourescent lamp 6 covered with a reflecting plate 5 is installed under the transparent plate 3, and light from the fluorescent lamp 6 is incident and reflected on the original 4. The light representing an image of the original 4 is reflected by a mirror 7, and passing through a lens 8 to converge on a CCD 9 which produces an original image signal $V_0$. The image of the original received by the CCD 9 is contracted by the lens 8. Beside the transparent plate 3 is provided a white reference plate 10 with which several characteristics of the original image, such as illuminance distribution on the original 4, $\cos^4\theta$ characteristics, mismatch among internal devices of the CCD 9 and the like, are compensated. Main scanning is acheived by relatively moving the plate 3 and the optical system by means of drive mechanism (not shown) in an x-direction at a constant speed corresponding to a prescribed magnification factor in the reading operation.

An image processing unit 11 receives an image signal $V_0$ and executes image processing, such as gradation correction, sharpness intensification, magnification and the like, thereby producing a processed image signal V.1 The processed image signal $V_1$ is supplied from the image processing unit 11 to a SPM unit (Screen Pattern Memory unit) 12. The SPM unit 12 comprises several SPM's for described later in detail. The threshold data will be hereinafter referred to as "screen pattern data". The processed image signal $V_1$ is compared with the threshold data in the SPM unit 12 in synchronism with a start signal $S_s$ supplied from a start sensor 14 provided in the recording unit 2, whereby a dot signal $S_d$ is produced. Exposure light in the recording scanner unit 2 is ON/OFF controlled by the dot signal $S_d$.

A film-feeding roller 15 is rotated by a subscanning drive motor 16, thereby feeding a film 17 as photosensitive material for recording images in a subscanning direction X.

A semiconductor laser 18 provided in the recording scanner unit 2 generates a laser beam modulated on the basis of the dot signal $S_d$ supplied from the SPM unit 12. The laser beam, which is initially diverging, is made into a parallel beam by a collimate lens 19, passing through a cylindrical lens 20 to converge on a mirror surface of a polygon mirror 21.

The polygon mirror 21 comprises a hexagonal mirror for reflecting and deflecting the laser beam. Each mirror surface of the hexagonal mirror deflects the laser beam to perform scanning on one main scanning line.

The laser beam reflected and deflected by the polygon mirror 21 passes through an $f\theta$ lens 22 and a cylindrical lens 23, and finally scans the surface of the film 17. The $f\theta$ lens 22 operates so that a beam spot of the laser beam on the film 17 has a constant size in any position on the main scanning line, and that the beam spot moves in proportion to an angle of rotation of the polygon mirror 21, that is, at a constant speed. The cylindrical lens 23 corrects the laser beam to mainly compensate fabrication errors of the polygon mirror 21.

Above the film 17, a mirror 24 and the start sensor 14 comprising photosensitive device such as photodiode are installed to detect the laser beam to thereby detect the beginning of each main scanning operation. The start sensor 14 supplies the start signal $S_s$ to the SPM unit 12 as described before to control timing for producing the dot singal $S_d$.

Figure 3A:
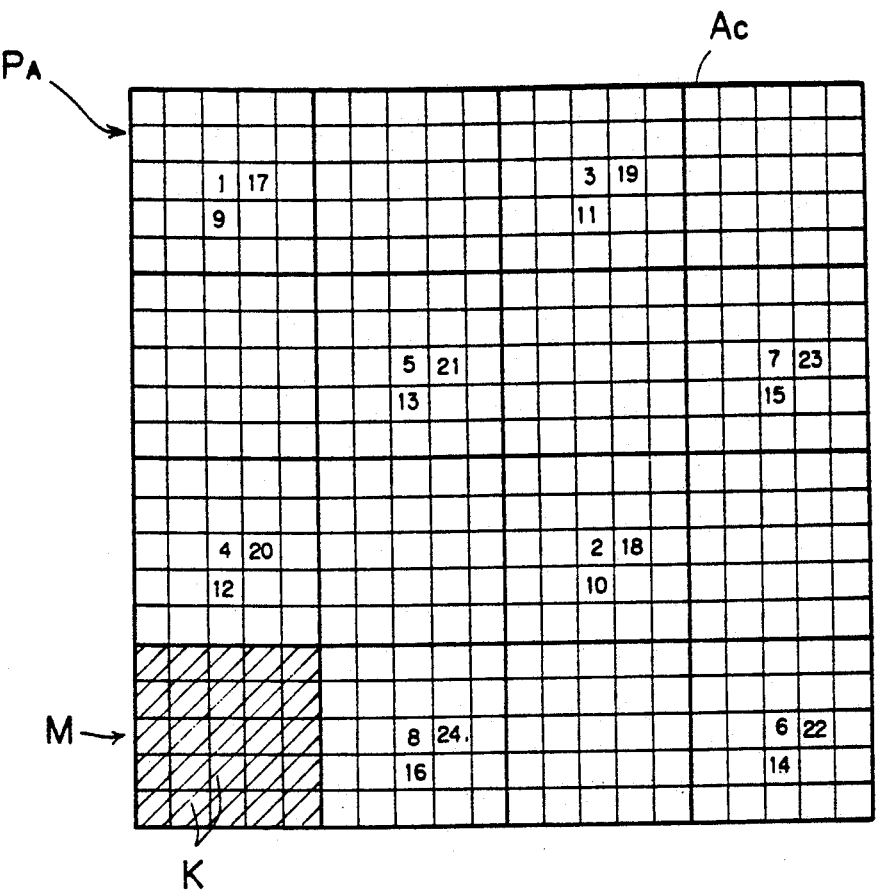
Figure 3B:
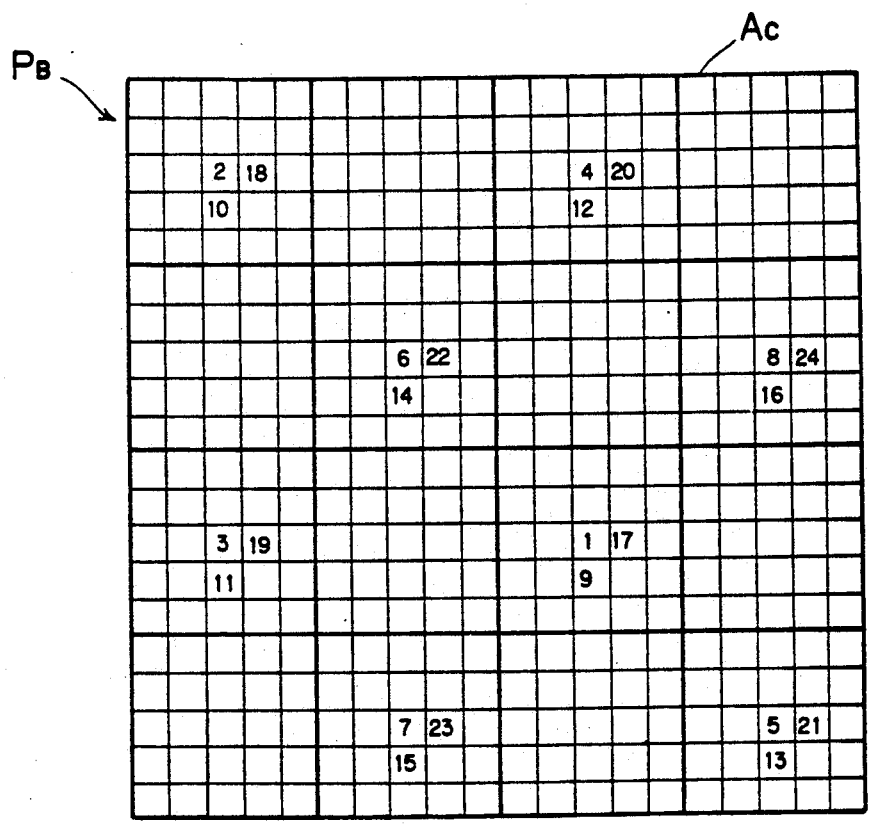

FIGS. 3A through 3C illustrate the arrangement of three sets of screen pattern data. The following explanation will be made about positive halftone image where a highlight area is formed of small halftone dots, for convenience of illustration.

Each of the three sets of screen pattern data $P_A$, $P_B$ and $P_C$ shown in FIGS. 3A through 3C, respectively, is assigned in a combined area (or a unit pixel block) $A_c$. The combined area $A_c$ includes sixteen unit areas M. One halftone dot is formed in a pair of unit areas as described below. The unit area M, which is shaded in FIG. 3A, is a $5 \times 5$ matrix of elementary areas (or pixels) K. The screen pattern data are compared with the processed image signal $V_1$, whereby the dot signal $S_d$ for controlling the exposure light is produced as described before. Therefore, the arrangement of the screen pattern data are established so that halftone-dot area rate in the combined area $A_c$ become proportional to the level of the processed image signal $V_1$. FIGS. 3A through 3C show only a part of the values of the screen pattern data. Since the combined area $A_c$ consists of 400 elementary areas K, the screen pattern data can have as many as 400 gradation levels if the elementary areas have respective values different from each other. The screen pattern data PA shown in FIG. 3A has basic data arrangement, and the data arrangement of the other screen pattern data $P_B$ and PC shown in FIGS. 3B and 3C, respectively, are slightly different from the basic data arrangement.

FIG. 4 also illustrates the structure of the combined area Ac. The combined area is a $4 \times 4$ matrix consisting of unit areas $M_{11}$–$M_{44}$. Shaded unit areas in FIG. 4B are to be exposed at least partly at the halftone-dot area rate of 50 percent or less, and shaded unit areas in FIG. 4C are to be exposed at least partly in addition to the shaded unit areas of FIG. 4B at the halftone-dot area rate of 51 percent or more. Namely, halftone dots (or solid portions) are formed checkerwise in the unit areas $M_{11}$, $M_{13}$, $M_{22}$, $M_{24}$, $M_{31}$, $M_{33}$, $M_{42}$ and $M_{44}$ at the halftone-dot area rate of 50 percent or less, and are formed additionally in the unit areas $M_{12}$, $M_{14}$, $M_{21}$, $M_{23}$, $M_{32}$, $M_{34}$, $M_{41}$ and $M_{43}$ at the halftone-dot area rate of 51 percent or more. Therefore, blank areas where halftone dots do not exist are formed checkerwise in the combined area when the combined area is in a shadow area.

The unit areas $M_{11}$–$M_{44}$ are classified into four groups $G_1$–$G_4$. The first group $G_1$ consists of the unit areas $M_{11}$, $M_{13}$, $M_{31}$ and $M_{33}$, as shown in FIG. 4B. and the second group $G_2$ consists of the unit areas $M_{22}$, $M_{24}$, $M_{42}$ and $M_{44}$. Similarly, as shown in FIG. 4C, the third group $G_3$ consists of the unit areas $M_{12}$, $M_{14}$, $M_{34}$ and $M_{32}$, and the fourth As can be seen from FIGS. 3A and 4A, the values from 1 to 4 of the screen pattern data $P_A$ are assigned to the unit areas in the group $G_1$, the values from 5 to 8 in the group $G_2$, the values from 9 to 12 in the group $G_1$, the values from 13 to 16 in the group $G_2$. In other words, four sequential values of the screen pattern data are assigned alternately to the groups $G_1$ and $G_2$ at the halftone-dot area rate of 50 percent or less. Similarly, four sequential values of the screen pattern data are assigned alternately to the groups $G_3$ and $G_4$ at the halftone-dot area rate of 51 percent or more. This is the same with the other screen pattern data $P_B$ and $P_C$. The three sets of screen pattern data $P_A$, $P_B$ and $P_C$ are different only in the order of assignment of the four sequential values in each group: for example, the values of 1 to 4 are respectively assigned to the unit areas $M_{11}$, $M_{33}$, $M_{13}$ and $M_{31}$ in this order in the screen pattern data $P_A$, to $M_{33}$, $M_{11}$, $M_{31}$ and $M_{13}$ in the screen pattern data $P_B$, and to $M_{31}$, $M_{13}$, $M_{33}$ and $M_{11}$ in the screen pattern data $P_C$. Consequently, all of the screen pattern data $P_A$, $P_B$ and $P_C$ give the same number of solid pixels in the combined unit area $A_c$ with respect to a given processed image data. In other words, the three screen pattern data give the same halftone-dot area rate representing density of an original image, and represent different pattern of solid pixels from each other. Further, as a result of the way of the assignment of the four sequential values, the differences between the values of the three screen pattern data $P_A$, $P_B$ and $P_C$ are within plus or minus three at a same position in the combined area $A_c$. These differences are so determined that the reproduced image represented by the halftone dots can attain similar tone gradation to an original image. In other words, if the differences are too large, the tone gradation of the reproduced image becomes much different from that of the original image.

Figure 5:
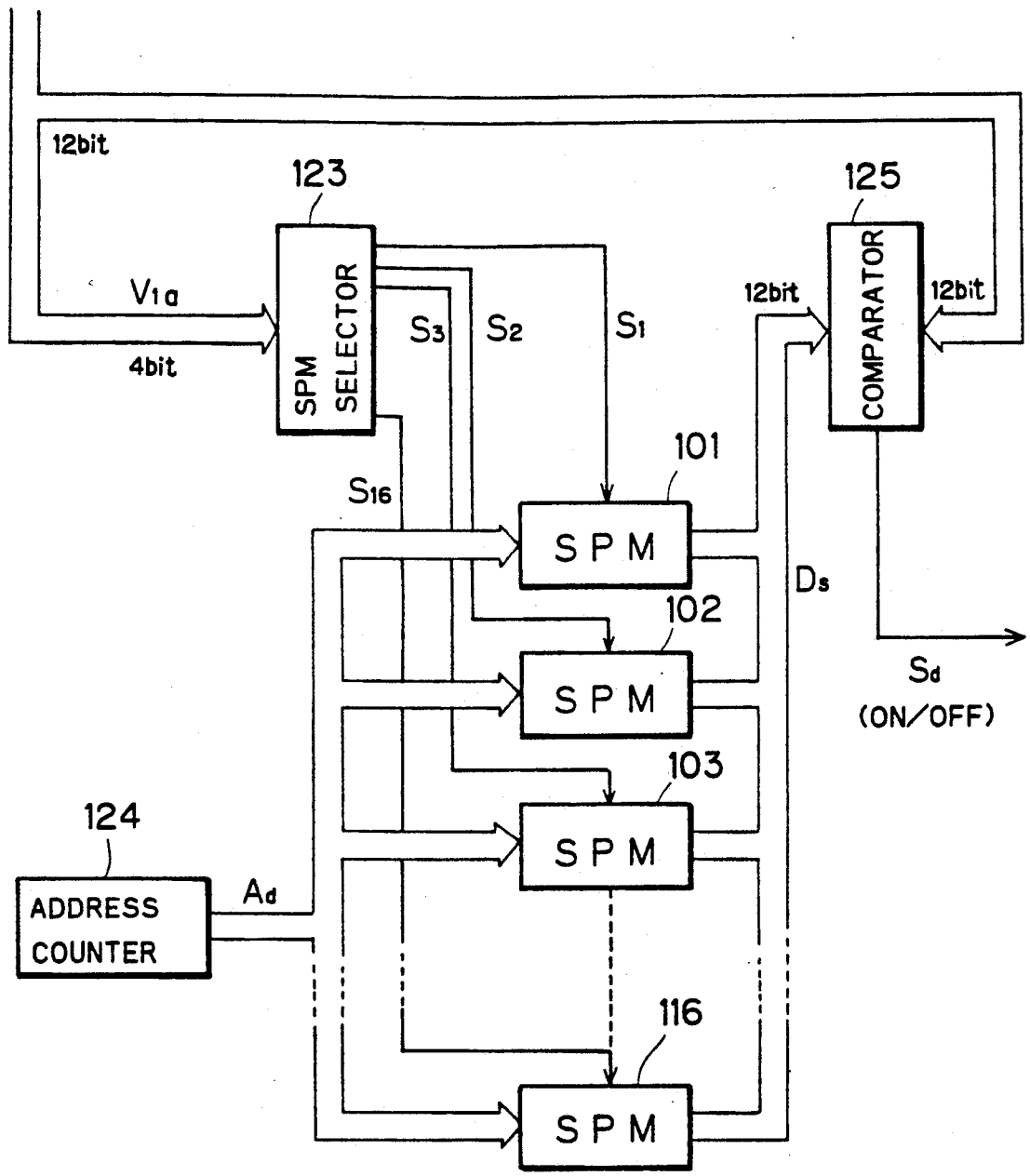

FIG. 5 is a block diagram showing the internal structure of the SPM unit 12. The SPM unit 12 comprises sixteen SPM's 101-116. Out of the sixteen SPM's, eight SPM's store the basic screen pattern data $P_A$, six SPM's store the screen pattern data $P_B$ and two SPM's store the screen pattern data $P_C$. Since one of the sixteen SPM's is randomly selected with respect to each pixel, as described later, the numbers of the SPM's for respective screen pattern data mean that the three screen pattern data $P_A$, $P_B$ and $P_C$ have substantial weighting factors of four, three and one, respectively.

The processed image signal $V_1$ is expressed by digital data of 12 bits, for example. The digital data of 12 bits can express four thousand gradation levels. However, because the screen pattern data $P_A$, $P_B$ and $P_C$ have the four hundred gradation levels in this embodiment, for convenience of illustration, the processed image signal $V_1$ only represents the four hundred gradation levels.

The processed image signal $V_1$ of 12 bits is supplied to a comparator 125, and a least-bit signal $V_{1a}$ consisting of the least four bits of the processed image signal $V_1$ is supplied to a SPM selector 123.

The least-bit signal $V_{1a}$ is a noise component which is given to the image signal when it is obtained through reading an original. Therefore, the least-bit signal $V_{1a}$ has a random value ranging from zero to sixteen. The SPM selector 123 decodes the least-bit signal $V_{1a}$ to produce sixteen selection signals $S_1$-$S_{16}$, one of which has "H" level correspondingly to the value of the least-bit signal $V_{1a}$. The selection signals $S_1$-$S_{16}$ are supplied to the SPM's 101-116, respectively, thereby randomly selecting one of the SPM's which receives "H" level signal.

Incidentally, the selection signals may be produced in a random number generator well known in the art. In this case, the SPM unit 12 may include only three SPM's for storing the three screen pattern data $P_A$, $P_B$ and $P_C$. The signals which are weighted by the weighting factors in a signal conversion means.

The SPM unit 12 further comprises an address counter 124. The address counter 124 produces an address signal $A_d$ to be given to the SPM's 101-116 on the basis of a positional signal (not shown) supplied from an encoder (not shown) which generates the positional signal representing the recording position on the film 17. The address signal $A_d$ indicates one of the elementary area K in the combined area $A_c$. One SPM which is selected by the selection signal $S_1$-$S_{16}$ outputs a threshold value $D_s$ for the elementary area (or pixel) indicated by the address signal $A_d$. The threshold data are supplied to the comparator 125 as well as the processed image signal $V_1$.

The comparator 125 compares the level of the processed image signal $V_1$ with the threshold data $D_s$ with respect to each pixel in order of scanning positions, thereby producing the binary dot signal $S_d$. The dot signal Ss is supplied to the semiconductor laser 18, as described before, whereby the laser beam is ON/OFF controlled and a halftone image is recorded on the film 17.

Figure 6:
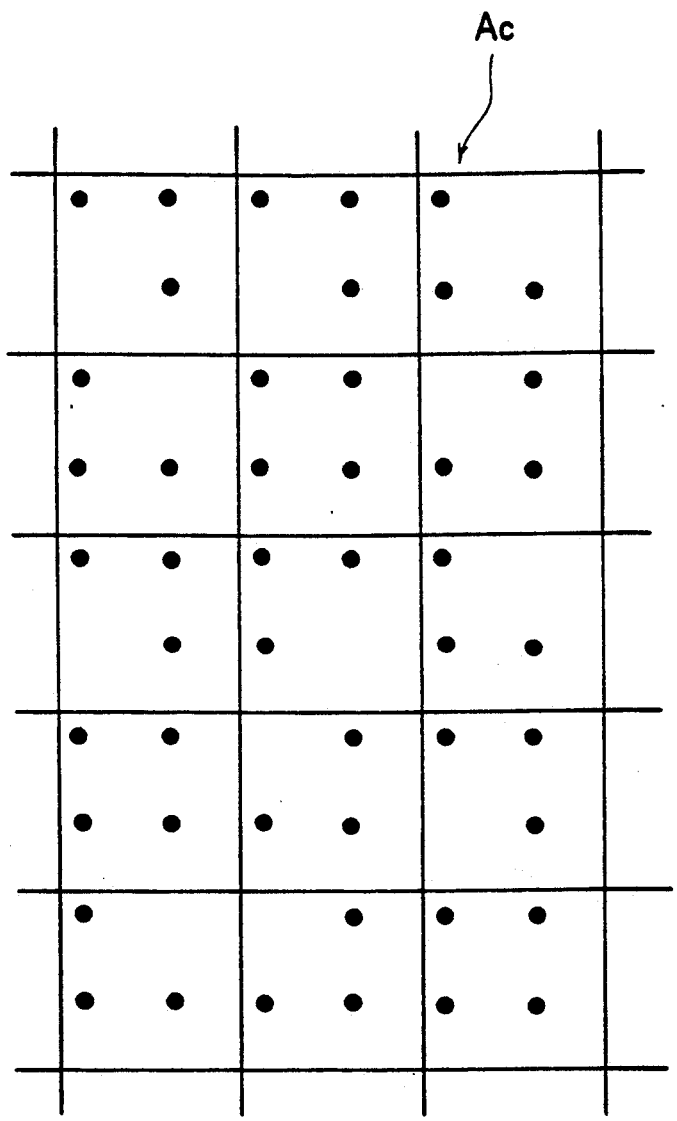
FIG. 6 illustrates halftone dots according to the preferred embodiment.

FIG. 6 illustrates a highlight area of a halftone image recorded according to the preferred embodiment of the present invention. In FIG. 6, the level of the processed image signal is assumed to be 3.5. Solid lines drawn in FIG. 6 indicates the boundaries between the combined areas $A_c$. As shown in FIG. 6, each combined area has three or four halftone dots, and the positions of the three or four halftone dots in each combined areas are occasionally different from each other. Since the threshold value is selected randomly with respect to each elementary area (or each pixel), each combined area shown in FIG. 6 does not correspond to one of the three screen pattern data $P_A$, $P_B$ and $P_C$. However, since the positions of the halftone dots in the combined areas are occasionally different from each other, these halftone dots cannot be seen as a grid-like lines as shown in FIGS. 1A through 1D.

In addition, the halftone dots shown in FIG. 6 have almost same size, even if they are placed at various positions, so that the tone gradation of the original image is faithfully represented by the halftone image; this is acheived by the fact that the differences between the threshold values at a same pixel in the three screen pattern data are within plus or minus three.

Incidentally, the screen pattern data $P_A$, $P_B$ and $P_C$ are not necessarily weighted by weighting factors. Namely, the SPM unit 12 may includes only three SPM's for storing the three screen pattern data, respectively. However, by weighting the screen pattern data with respective weighting factors, it can be prevented that the halftone dots are placed collectively at some points and scarcely at other points, which is seen to include areas of deep density and light density.

The number of the screen pattern data is not limited to three, but it can be any more than two. Further, the weighting factors for respective screen pattern data can be changed arbitrarily.

The threshold values of the screen pattern data $P_A$, $P_B$ and $P_C$ for the shadow area, or an area having the halftone-dot area rate of about 90 percent or more, are arranged in the same manner as that for the highlight area described above. Further, the arrangement of the screen pattern data $P_A$, $P_B$ and $P_C$ can be same for middle tone areas, which have the halftone-dot area rate ranging from about 10 percent to about 90 percent, because the problem of the prior art is important only in the highlight area having the halftone-dot area rate of about 10 percent or less and in the shadow area having the halftone-dot area rate of about 90 percent or more.

FIG. 7 is a block diagram showing the internal structure of the SPM unit 12 which employ an additional SPM 100 for storing the threshold values for the middle tone area. The SPM's 101a–116a store the threshold values only for the highlight and shadow areas. Since the total number of gradation levels required for the highlight and shadow areas are smaller than for the middle tone area, the threshold values stored in the SPM's 101a–116a can be expressed by digital data of less number of bits than those for the middle tone area stored in the SPM 100. Consequently, the threshold values are stored in the SPM's 101a–116a with less number of bits, which decreases the capacity and the cost of the SPM's 101a–116a.

The SPM unit 12 shown in FIG. 7 comprises a density modulation unit 122 which is connected to the SPM selector 123. The density modulation unit 122 comprises a gradation range judging unit 122a, a code setting unit 122b, and a random number generation circuit 122c. The gradation range judging unit 122a receives the processed image signal $V_1$, and if the processed image signal $V_1$ represents a density level in the middle tone area, the gradation range judging unit 122a makes the code setting unit 122b output a prescribed code of 4-bit data indicating that the density level is in the middle tone area. If the processed image signal $V_1$ represents a density level out of the middle tone area, the gradation range judging unit 122a makes the random number generation circuit 122c output a random number other than the prescribed code.

The SPM selector 123 selects the SPM 100 for the middle tone area if the prescribed code is supplied from the density modulation unit 122. Otherwise, the SPM selector 123 selects one of the SPM's 101a–116a in response to the random number supplied from the density modulation unit 122 in the same manner as the selector shown in FIG. 5.

Although the halftone image produced according to the above described embodiment is a positive image, a negative image can be made in a similar manner, where the descriptions about the highlight area and the shadow area are exchanged.

According to the present invention, the grid-like patterns and the line patterns in highlight and shadow areas of a halftone image can be prevented.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A method of forming halftone dots in a halftone image, comprising the steps of:
   (a) preparing image data representing an original image,
   (b) preparing plural sets of threshold data, each of which includes a predetermined threshold value assigned to respective pixels in a unit pixel block of a prescribed shape, said plural sets of threshold data each having a different arrangement of said threshold values,
   (c) fixing the correspondence of each pixel in said original image to each pixel in said unit pixel block,
   (d) randomly selecting one of said plural sets of threshold data with respect to each pixel to thereby pick up one of said threshold values in a selected set of threshold data at each pixel,
   (e) comparing said image data with a threshold value picked up by step (d) with respect to each pixel, to thereby produce a dot signal indicating whether or not each pixel is to be solid, and
   (f) forming halftone dots as a function of said dot signal;
   wherein each of said plural sets of threshold data is so established that a plurality of halftone dots are to be formed in said unit pixel block; and
   wherein said threshold values in each of said plural sets of threshold data are different from each other.

2. A method of forming halftone dots in a halftone image, comprising the steps of:
   (a) preparing image data representing an original image,
   (b) preparing plural sets of threshold data, each of which includes predetermined threshold values assigned to respective pixels in a unit pixel block of a prescribed shape, said plural sets of threshold data each having a different arrangement of said threshold values,
   (c) fixing the correspondence of each pixel in said original image to each pixel in said unit pixel block,
   (d) randomly selecting one of said plural sets of threshold data with respect to each pixel to thereby pick up one of said threshold values in a selected set of threshold data at each pixel, wherein said selecting is executed while probabilities of selecting said respective plural sets of threshold data are fixed in advance,
   (e) comparing said image data with a threshold value picked up by step (d) with respect to each pixel, to thereby produce a dot signal indicating whether or not each pixel is to be solid, and
   (f) forming halftone dots as a function of said dot signal, wherein
   each of said plural sets of threshold data is so established that a plurality of halftone dots are to be formed in said unit pixel block.

3. A method in accordance with claim 2, wherein said threshold values in each of said plural sets of threshold data are different from each other.

4. A method in accordance with claim 3, wherein said plural sets of threshold data are so established that said halftone dots are formed checkerwise in said unit pixel block when said image data for said unit pixel block has a data value corresponding to a halftone-dot area rate of at most about 10 percent.

5. A method in accordance with claim 4, wherein said plural sets of threshold data are so established that blank areas at which said halftone dots do not exist are formed checkerwise in said unit pixel block when said image data for said unit pixel block has a data value corresponding to a halftone-dot area rate of at least about 90 percent.

6. A method in accordance with claim 5, wherein differences between said threshold values of said plural sets of threshold data at each pixel in said unit pixel block are within a prescribed range.

7. A method in accordance with claim 6, wherein said threshold values at each pixel in said unit pixel block are common to said plural sets of threshold data in a range of said threshold values corresponding to a halftone-dot area rate ranging from at least about 10 percent to at most about 90 percent.

8. An apparatus for forming halftone dots in a halftone image, comprising:
   (a) means for providing image data representing an original image,
   (b) means for storing plural sets of threshold data, each of which includes predetermined threshold values assigned to respective pixels in a unit pixel block of a prescribed shape, said plural sets of threshold data having different arrangement of said threshold values from each other,
   (c) means for fixing the correspondence of each pixel in said original image to each pixel in said unit pixel block,
   (d) selecting means for randomly selecting one of said plural sets of threshold data with respect to each pixel to thereby pick up one of said threshold values in a selected set of threshold data at each pixel.
   (e) means for comparing said image data with a threshold value picked up by said selecting means with respect to each pixel, and producing a dot signal indicating whether or not each pixel is to be solid, and
   (f) means for forming halftone dots as a function of said dot signal;
   wherein each of said plural sets of threshold data is so established that a plurality of halftone dots are to be formed in said unit pixel block; and
   wherein said threshold values in each of said plural sets of threshold data are different from each other.

9. An apparatus for forming halftone dots in a halftone image, comprising:
   (a) means for providing image data representing an original image,
   (b) means for storing plural sets of threshold data, each of which includes predetermined threshold values assigned to respective pixels in a unit pixel block of a prescribed shape, said plural sets of threshold data each having a different arrangement of said threshold values,
   (c) means for fixing the correspondance of each pixel in said original image to each pixel in said unit pixel block,
   (d) selecting means for randomly selecting one of said plural sets of threshold data with respect to each pixel to thereby pick up one of said threshold values in a selected set of threshold data at each pixel, wherein said selecting means selects one of said plural sets of threshold data while probabilities of selecting said respective plural set of threshold data are fixed in advance,
   (e) means for comparing said image data with a threshold value picked up by said selecting means with respect to each pixel, and producing a dot signal indicating whether or not each pixel is to be solid, and
   (f) means for forming halftone dots as a function of said dot signal, wherein
   each of said plural sets of threshold data is so established that a plurality of halftone dots are to be formed in said unit pixel block.

10. An apparatus in accordance with claim 9, wherein said threshold values in each of said plural sets of threshold data are different from each other.

11. An apparatus in accordance with claim 10, wherein
    said plural sets of threshold data are so established that said halftone dots are formed checkerwise in said unit pixel block when said image data for said unit pixel block has a data value corresponding to a halftone-dot area rate of at most about 10 percent.

12. An apparatus in accordance with claim 11, wherein
    said plural sets of threshold data are so established that blank areas at which said halftone dots do not exist are formed checkerwise in said unit pixel block when said image data for said unit pixel block has a data value corresponding to a halftone-dot area rate of at least about 90 percent.

13. An apparatus in accordance with claim 12, wherein
    differences between said threshold values of said plural sets of threshold data at each pixel in said unit pixel block are within a prescribed range.

14. An apparatus in accordance with claim 13, wherein
    said threshold values at each pixel in said unit pixel block are common to said plural sets of threshold data in a range of said threshold values corresponding to a halftone-dot area rate ranging from at least about 10 percent to at most about 90 percent.

* * * * *